United States Patent
Fishburn

(10) Patent No.: US 6,875,824 B2
(45) Date of Patent: Apr. 5, 2005

(54) POLY(ARYLENE ETHER)/POLYAMIDE COMPOSITION

(75) Inventor: James Ross Fishburn, Slingerlands, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/604,031

(22) Filed: Jun. 23, 2003

(65) Prior Publication Data

US 2004/0260036 A1 Dec. 23, 2004

(51) Int. Cl.[7] .............................................. C08L 77/00
(52) U.S. Cl. ........................ 525/419; 524/262; 524/611; 524/115; 525/474
(58) Field of Search .............................. 524/262, 611, 524/115, 419, 474; 525/419, 474

(56) References Cited

U.S. PATENT DOCUMENTS

| | | | |
|---|---|---|---|
| 2,071,250 A | 2/1937 | Carothers | 260/106 |
| 2,071,251 A | 2/1937 | Carothers | 18/54 |
| 2,130,523 A | 9/1938 | Carothers | 260/124 |
| 2,130,948 A | 9/1938 | Carothers | 18/54 |
| 2,241,322 A | 5/1941 | Hanford | 260/2 |
| 2,312,966 A | 3/1943 | Hanford | 260/78 |
| 2,512,606 A | 6/1950 | Bolton et al. | 260/78 |
| 4,315,086 A | 2/1982 | Ueno et al. | 525/391 |
| 4,600,741 A | 7/1986 | Aycock et al. | 524/139 |
| 4,642,358 A | 2/1987 | Aycock et al. | 549/245 |
| 4,826,933 A | 5/1989 | Grant et al. | 525/397 |
| 4,927,894 A | 5/1990 | Brown | 525/390 |
| 4,980,424 A | 12/1990 | Sivavec | 525/397 |
| 5,000,897 A * | 3/1991 | Chambers | 264/141 |
| 5,041,504 A | 8/1991 | Brown et al. | 525/396 |
| 5,115,042 A | 5/1992 | Khouri et al. | 525/397 |
| 5,714,550 A | 2/1998 | Shaw | 525/393 |

OTHER PUBLICATIONS

Krevellen et al., "Properties of Polymers", Elsevier Scientific Publishing Company, (1976), pp. 523–525.*
Bueche, "Physical Properties of Polymers", Interscience Publishers, (1970), pp. 112–116 and 295–303.*

* cited by examiner

Primary Examiner—Kuo-Liang Peng

(57) ABSTRACT

Disclosed herein is a polymer composition comprising a poly(arylene ether) resin; a polyamide resin having a weight average molecular weight greater than or equal to about 75,000 as determined by gel permeation chromatography using polystyrene standards; an impact modifier; and a flame retardant.

32 Claims, No Drawings

POLY(ARYLENE ETHER)/POLYAMIDE COMPOSITION

BACKGROUND OF INVENTION

This disclosure relates to poly(arylene ether) (PAE)/polyamide (PA) blends, and more particularly relates to impact resistant, flame retardant poly(arylene ether)/polyamide blends.

Laws and regulations in many countries require polymer compositions to have flame retardant properties when used in certain applications. However, the inclusion of additives such as impact modifiers, glass fibers and other fillers tend to increase the flammability of the composition.

Accordingly, a number of systems for increasing the flame retardance of various polymers have been developed. These flame-retarding systems usually involve mixing or blending the plastics with one or more flame retardants, sometimes in combinations with a synergist. Many flame retardants currently in use contain/comprise halogens and their use is increasingly being restricted. As a result, flame resistant compositions that are substantially halogen free are increasingly in demand.

Additionally, many applications require a polymer composition having a combination of flame retardance and high impact resistance properties. Unfortunately, high impact resistance is usually achieved at the expense of flame retardancy, as impact modifiers tend to be flammable. Conversely, the addition of many known flame retardants tends to adversely affect impact resistance. There accordingly remains a need in the art for compositions that have both excellent flame retardance and excellent impact resistance.

SUMMARY OF INVENTION

Disclosed herein is a flame-retardant, impact resistant composition comprising a poly(arylene ether) resin, a polyamide resin having a weight average molecular weight greater than or equal to 75,000 as determined by gel permeation chromatography using polystyrene standards, an impact modifier, and a flame retardant.

The above and other features are exemplified by the following and detailed description.

DETAILED DESCRIPTION

Disclosed herein are compositions and reaction products comprising a poly(arylene ether) resin, a polyamide resin having a weight average molecular weight greater than or equal to 75,000, an impact modifier, and a flame retardant. The composition may comprise more than one poly(arylene ether) resin, more than one polyamide resin, more than one impact modifier and/or more than one flame retardant. The composition may also optionally comprise fillers, additives, and the like. The composition exhibits a unique combination of high impact resistance and fire retardance. Particularly, it is unexpected that use of a high molecular weight polyamide would improve fire retardance and maintain impact resistance.

The term poly(arylene ether) resin includes, but is not limited to, polyphenylene ether (PPE); poly(arylene ether) copolymers graft copolymers; or poly(arylene ether) ionomers; block copolymers of alkenyl aromatic compounds, vinyl aromatic compounds, and poly (arylene ether); and combinations comprising at least one of the foregoing. Poly(arylene ether) resins per se, are known polymers comprising a plurality of structural units of the formula (I):

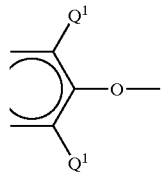

wherein for each structural unit, each $Q^1$ is independently a hydrogen, halogen, a primary or secondary lower alkyl (e.g., alkyl containing up to 7 carbon atoms), a phenyl, a haloalkyl, an aminoalkyl, a hydrocarbonoxy, a halohydrocarbonoxy wherein at least two carbon atoms separate the halogen and oxygen atoms, or the like; and each $Q^2$ is independently a hydrogen, a halogen, a primary or secondary lower alkyl, a phenyl, a haloalkyl, a hydrocarbonoxy, a halohydrocarbonoxy wherein at least two carbon atoms separate the halogen and oxygen atoms, or the like. Preferably, each $Q^1$ is an alkyl or a phenyl, especially $C_{1-4}$ alkyl, and each $Q^2$ is hydrogen. Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from the copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly (arylene ether) chains to produce a higher molecular weight polymer. Poly(arylene ether) resins of the present embodiment further include combinations comprising at least one of the above.

The poly(arylene ether) resin generally has a number average molecular weight of about 3,000 to about 40,000 atomic mass units (amu) and a weight average molecular weight of about 20,000 to about 80,000 amu, as determined by gel permeation chromatography. The poly(arylene ether) resin may have an intrinsic viscosity of about 0.10 to about 0.60 deciliters per gram (dl/g), preferably about 0.29 to about 0.48 dl/g, as measured in chloroform at 25Â° C. It is also possible to utilize a high intrinsic viscosity poly(arylene ether) resin and a low intrinsic viscosity poly(arylene ether) resin in combination. Determining an exact ratio, when two intrinsic viscosities are used, will depend somewhat on the exact intrinsic viscosities of the poly(arylene ether) resin used and the ultimate physical properties that are desired.

The poly(arylene ether) resin may be prepared by the oxidative coupling of a monohydroxyaromatic compound such as 2,6-xylenol or 2,3,6-trimethylphenol. Catalyst systems are generally employed for such coupling; they typically contain at least one heavy metal compound such as a copper, manganese, or cobalt compound, usually in combination with various other materials.

Particularly useful poly(arylene ether) resins for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, generally obtained from reaction mixtures in which a by-product diphenoquinone is present, especially in a copper-halide-secondary or tertiary amine system. A substantial proportion of the polymer molecules, generally constituting as much as about 90 wt % of the polymer, may contain at least one of the aminoalkyl-containing and 4-hydroxybiphenyl end groups.

Based upon the foregoing, it will be apparent to those skilled in the art that the contemplated poly(arylene ether) resin may include many of those poly(arylene ether) resins presently known, irrespective of variations in structural units or ancillary chemical features.

The composition may comprise about 18 weight percent (wt %) to about 65 wt % of the poly(arylene ether) resin, based on the total weight of the composition (i.e. poly (arylene ether), polyamide, impact modifier, fire retardant, optional compatibilizer, and optional additive(s)). Within this range, the composition preferably comprises greater than or equal to about 20 wt %, more preferably greater than or equal to about 25 wt %, and most preferably greater than or equal to about 30 wt % poly(arylene ether). Also within this range, the composition preferably comprises less than or equal to about 60 wt %, more preferably less than or equal to about 55 wt %, and most preferably less than or equal to about 50 wt % poly(arylene ether).

Polyamide resin includes a generic family of resins known as nylons, characterized by the presence of an amide group (—C(O)NH—) and may be aliphatic, aromatic or a combination of aliphatic and aromatic. Nylon-6 and nylon-6,6 are the generally preferred polyamide resins and are available from a variety of commercial sources. Other polyamide resins, however, such as nylon-4,6, nylon-12, nylon-6,10, nylon 6,9, nylon 6/6T, nylon 6,6/6T, and nylon 9T with triamine contents below about 0.5 weight percent (wt %), as well as others, such as the amorphous nylons, may be useful in the poly(arylene ether)/polyamide composition. Mixtures of various polyamides, as well as various polyamide copolymers, may also be useful. The polyamide resin has a weight average molecular weight (Mw) greater than or equal to about 75,000, preferably greater than or equal to about 79,000, and more preferably greater than or equal to about 82,000, as determined by gel permeation chromatography employing polystyrene standards.

Polyamide resin can be obtained by a number of well-known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl) methane, di-(4-aminocyclohexyl)methane, 2,2-di-(4-aminophenyl) propane, and 2,2-di-(4-aminocyclohexyl) propane, among others. Copolymers of caprolactam with diacids and diamines are also useful.

The composition may comprise about 35 wt % to about 70 wt % of the polyamide resin, based on the total weight of the composition. Within this range, the composition preferably comprises greater than or equal to about 38 wt %, more preferably greater than or equal to about 40 wt %, and most preferably greater than or equal to about 45 wt % polyamide resin. Also within this range, the composition preferably comprises less than or equal to about 67 wt %, more preferably less than or equal to about 65 wt %, and most preferably less than or equal to about 62 wt % polyamide resin.

The composition also comprises an impact modifier, i.e., an additive that improves the impact properties of the composition, for example notched Izod impact strength. Examples of suitable impact modifiers include block copolymers; elastomers, such as, polybutadiene; random copolymers, such as ethylene vinyl acetate (EVA); and combinations comprising at least one of the foregoing impact modifiers.

Particularly suitable impact modifiers are block copolymers, for example, A-B diblock copolymers and A-B-A triblock copolymers having one or two alkenyl aromatic blocks A, which are generally styrene blocks, and a rubber block, B, which is generally an isoprene or butadiene block. The butadiene block may be partially hydrogenated. Mixtures of these diblock and triblock copolymers are especially useful.

Suitable A-B and A-B-A copolymers include, but are not limited to, polystyrene-polybutadiene, polystyrene-poly(ethylene-propylene), polystyrene-polyisoprene, poly(alpha-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as selectively hydrogenated versions thereof, and the like, as well as combinations comprising at least one of the foregoing impact modifiers, with polystyrene-polybutadiene-polystyrene block copolymer preferred. Such A-B and A-B-A block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

The composition comprises about 1 wt % to about 15 wt % impact modifier, based on the total weight of the composition. Within this range, the composition preferably comprises greater than or equal to about 2 wt %, more preferably greater than or equal to about 4 wt %, most preferably greater than or equal to about 5 wt % impact modifier. Also within this range, the composition preferably comprises less than or equal to about 13 wt %, more preferably less than or equal to about 11 wt %, and most preferably less than or equal to about 10 wt % impact modifier.

The composition comprises a flame retardant capable of enhancing the flame retardant properties of a poly(arylene ether)/polyamide composition and which is compatible with the poly(arylene ether)/polyamide composition. Possible flame retardants include halogenated flame retardants, such as halogenated aromatic compounds (e.g., halogenated phenols, and the like). Halogenated flame retardants may be used with synergists, such as antimony trioxide.

However, non-halogen flame retardants are preferred. As used herein and throughout, non-halogen flame retardants refer to those retardants that contain less than or equal to about 1 wt % halogen, based on the total weight of the flame retardant. Such retardants include, for example, red phosphorous, iron compounds, organo phosphorous compounds, aluminum trihydrate, boron compounds, organic nitrogen containing compounds (e.g., melamine or melamine cyanaurate), inorganic phosphorous compounds, silicone based compounds, and the like. Combinations comprising at least one of the foregoing flame retardants may also be used.

In one embodiment, the flame retardant comprises at least one boron compound and at least one polysiloxane. The polysiloxane may be selected from the group consisting of polysiloxane and siloxane copolymers, such as polyphenylene ether or polyetherimide siloxane copolymers. The preferred polysiloxane compounds are commercially available and are represented by the formula II

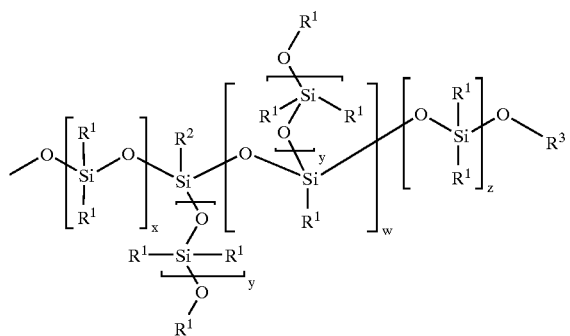

wherein each $R^1$ is in dependently a $C_{1-5}$ alkyl group and preferably a methyl group and $R^2$ is a $C_{1-5}$ alkyl group or a primary or secondary amino group such as a N-(2-aminoalkyl)-3-aminoalkyl group, provided that $R^2$ is a $C_{1-5}$ alkyl group when w is 1 and a N-(2-aminoalkyl)-3-aminoalkyl group when w is 0. It is often preferred that $R^2$ is a methyl group or a N-(2-aminoethyl)-3-aminopropyl group. R is hydrogen or a $C_{1-5}$ alkyl group, preferably a methyl group. W is 0 or 1 and x and y are each independently an integer from 1 to 7 and z is an integer from 0 to 7. It is noted herein that any combination of compounds represented by formula II may be employed.

It is also within the scope of the invention to employ polysiloxanes

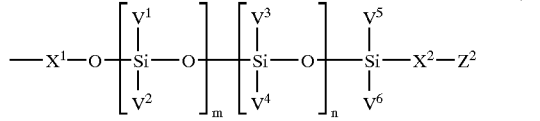

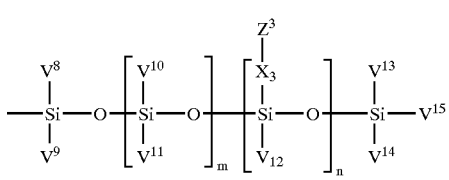

wherein m+n has a value of 5–2000, $V^1$–$V^{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X^1$, $X^2$, $X^3$, each independently of each other, represent one of the following groups; alkylene, cycloalkylene, arylene, aralkylene, alkylarylene; wherein $Z^1$, $Z^2$, $Z^3$ each represent one of the following groups: $-NV^{16}V^{17}$, $-NH-(CH_2)_q-NV^{16}V^{17}$ in which $V^{16}$ and $V^{17}$, each independently of each other, represent a hydrogen atom or an alkyl group having 1–12 carbon atoms, q has a value from 1–10, an aliphatic or cycloaliphatic epoxide, a carboxylic acid or anhydride group, $Z^1$ or $Z^2$ is a hydrogen atom, in which, however, the compound of formula III may not comprise simultaneously an amino group and an epoxide group or not simultaneously an amino group and a carboxylic acid group, or not simultaneously an epoxide group, and a carboxylic acid or anhydride group.

Organic and inorganic boron compounds may be used, the amount of the compounds being such that the boron content of the polymer composition, calculated as atomic boron, is about 0.02 to about 5, preferably about 0.2 to about 1 wt. %.

Suitable boron compounds include, but are not limited to, boric acid, metal borates, boron phosphate, perborates and the like. Preferred boron compounds include metal borates (and perborates), alkali metal borate (sodium, potassium etc), alkaline earth borates (calcium, barium and magnesium) and transition metal borates, such as zinc borate. Those metal borates as well as metal perborates, are preferably used in the anhydrous form.

The composition additionally may contain inorganic phosphates and/or titanium oxide. Examples of suitable inorganic phosphates are the alkali metal (including ammonium) phosphates, alkali metal hydrogen phosphates, alkali metal pyrophospates and the like. In one embodiment the boron compound and the inorganic phosphate may be combined in boron phosphate.

The amounts of both the phosphate compound and the titanium oxide may be selected within wide ranges, each being preferably between 0.1 and 20 wt % based on the total weight of the composition.

Other additives that may be employed to enhance flame retardancy include phosphine oxides, such as triarylphosphine oxides and aromatic phosphates, especially diphosphates. Illustrative examples of triarylphosphine oxides include triphenylphosphine oxide, tritolylphosphine oxide, trinonylphosphine oxide, tripiperidine phosphine oxide and trinapthylphosphine oxide. Triphenylphosphine oxide is often preferred. The aromatic diphosphates that may be employed in this invention have the formula V

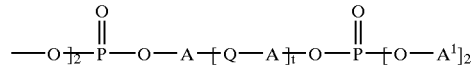

wherein each A and $A^1$ are independently a substituted or unsubstituted aliphatic, alicyclic or aromatic radical and Q is a covalent bond linking a carbon in each A or a bridging radical selected from the group consisting of $CH_2$, $C(CH_3)_2$, S, $SO_2$, CO, O and N=N and t is an integer from 0 to 4. A suitable example of an aromatic monophosphate is triphenylphosphate.

Additional additives that may be employed to enhance flame retardancy include melamine cyanurate and aluminium and magnesium hydroxide. Fillers such as mineral fillers may be added, such as calcium or barium sulfate.

The flame retardant is preferably present in at least the minimum amount necessary to impart a degree of flame retardancy to the composition to pass the UL-94 V-0 protocol for flame retardancy. The particular amount will vary, depending, on the amount of the resin used in the composition, the particular blend, the type and amount of other additives, and similar considerations.

The composition may comprise about 4 wt % to about 50 wt % of the flame retardant or combination of flame retardants, wherein weight percent is based on the total weight of the composition. Within this range, the composition preferably comprises greater than or equal to about 4.5 wt %, more preferably greater than or equal to about 5 wt %, and most preferably greater than or equal to about 5.5 wt % flame retardant or combination of flame retardants. Also within this range, the composition preferably comprises less than or equal to about 35 wt %, more preferably less than or equal to about 25 wt %, and most preferably less than or equal to about 15 wt % flame retardant or combination of flame retardants.

In one embodiment, the composition comprises about 1 to about 30 weight percent boron compound and about 1 to about 20 weight percent polysiloxane, based on the total weight of the composition. Within this range, the composition preferably comprises greater than or equal to about 1.5 wt %, and more preferably greater than or equal to about 2 wt % boron compound. Also within this range, the composition preferably comprises less than or equal to about 20 wt %, more preferably less than or equal to about 15 wt %, and most preferably less than or equal to about 10 wt % boron compound. With regard to the polysiloxane, the composition preferably comprises greater than or equal to about 1.5 wt %, and more preferably greater than or equal to about 2 wt % polysiloxane. Also within this range, the composition preferably comprises less than or equal to about 15 wt %, more preferably less than or equal to about 10 wt %, and most preferably less than or equal to about 5 wt % polysiloxane.

In addition to the poly(arylene ether) resin, polyamide resin, impact modifier, and flame retardant, the composition may also optionally comprise compatibilizers and/or additives. As used herein and throughout, a compatibilizer is a polyfunctional compound that interacts with either the poly(arylene ether) resin, the polyamide resin, or both. This interaction may be chemical (e.g. grafting) and/or physical (e.g. affecting the surface characteristics of the dispersed phases). When the interaction is chemical, the compatibilizer may be partially or completely reacted with the poly(arylene ether) resin, polyamide resin or both such that the composition is a reaction product. A preferred compatibilizer is one that improves the compatibility between the poly(arylene ether) and the polyamide, as may be evidenced by enhanced impact strength, mold knit line strength, and/or elongation.

When used, the composition may comprise about 0.05 wt % to about 25 wt % of compatibilizer. Within this range, the composition preferably comprises less than or equal to about 15 wt %, more preferably less than or equal to about 10 wt %, and most preferably less than or equal to about 5 wt % compatibilizer. Also within this range, the composition preferably comprises greater than or equal to about 0.1 wt %, more preferably greater than or equal to about 0.15 wt %, and most preferably greater than or equal to about 0.2 wt % compatibilizer.

Examples of the various compatibilizers that may be employed include:

liquid diene polymers, epoxy compounds, oxidized polyolefin wax, quinones, organosilane compounds, polyfunctional compounds, and functionalized polyphenylene ether as obtained by reacting one or more of the previously mentioned compatibilizers with polyphenylene ether. The foregoing compatibilizers are more fully described in U.S. Pat. Nos. 4,315,086; 4,600,741; 4,642,358; 4,826,933; 4,927,894; 4,980,424; 5,041,504; and 5,115,042.

The foregoing compatibilizers may be used alone or in various combinations comprising at least one of these compatibilizers. Furthermore, they may be added directly to the melt blend or pre-reacted with either or both of the poly(arylene ether) resin and polyamide resin, as well as with other materials employed in the preparation of the composition. Where the compatibilizers are employed in the preparation of the compositions, the initial amount used will depend upon the specific compatibilizer chosen and the specific amounts of poly(arylene ether) resin and polyamide resin employed.

The composition may also comprise additives. Possible additives include anti-oxidants, drip retardants, dyes, pigments, colorants, stabilizers, small particle minerals (e.g., clay, mica, talc, and the like), antistatic agents, plasticizers, lubricants, and combinations comprising at least one of the foregoing additives. These additives are known in the art, as are their effective levels and methods of incorporation. Especially preferred additives include hindered phenols, thio compounds and amides derived from various fatty acids. Effective amounts of the additives vary widely, but they are usually present in an amount of less than or equal to about 50 wt % or so, based on the total weight of the composition. The preferred amounts of these additives is generally about 0.25 wt % to about 2 wt %, based upon the total weight of the composition.

The composition has a flame retardance of V-1 or better as determined by UL 94 at a thickness of about 3.2 millimeters (mm).

The composition has a notched Izod impact resistance greater than or equal to about 45 Joules per meter (J/m), preferably greater than or equal to about 50 J/m, and more preferably greater than or equal to about 60 J/m. The composition has a reverse notched Izod impact resistance greater than or equal to about 500 J/m, preferably greater than or equal to about 700 J/m, and more preferably greater than or equal to about 900 J/m.

The composition can be prepared using various techniques, including batch and continuous techniques that employ kneaders, extruders, mixers, and the like. For example, the composition can be formed as a melt blend employing a twin screw extruder. In the extruder, the components, i.e., the poly(arylene ether) resin, polyamide resin, impact modifier, flame retardant, optional compatibilizers, and optional additive may all be added to the extruder at the feed throat or may be added sequentially (e.g., where some of the components are added downstream of the feed throat). For example, the polyamide may be added to the extruder in the subsequent feeding section downstream.

The above described composition is further illustrated by the following non-limiting examples.

EXAMPLES

Four compositions differing primarily in the amount and type of polyamide used, and in the amount of impact modifier used, were formed by means a WP 30 millimeter (mm) co-rotating intermeshing twin screw extruder. Th components of the compositions are listed in Table 1. The poly(arylene ether), antioxidants, compatibilizers, flame retardants and impact modifier were added at the feedthroat of the extruder and the polyamide resin was added downstream. The extruder was set with barrel temperatures betwe 240Â° C. and 300Â° C. The material was run at 45 pounds per hour (lb/hr) with the screw rotating at 350 rotations per minute (rpm). All samples wer molded via injection molding with the molding machine set at 299Â° C. and mold set at 88Â° C. and tested for notched Izod impact and reverse notche Izod impact according to ASTM D256. The flame out time (FOT) for a 3.2 millimeter (mm) bar was tested according to UL Bulletin 94. Values shown in Table 3 are an average of 10 bars. The probability of passing a UL 94 flammability test was based on the evaluation flame out time and drip behavior of 10 bars having a thickness of 3.2 mm. The components of eac of the compositions is shown in Table 2, wherein the amounts of each component is expressed in weight percent, based on the total weight of th composition. The data is shown in Table 3.

TABLE 1

| Component | Tradename/Supplier |
|---|---|
| Polyphenylene ether | Noryl/GE Plastics |
| Antioxidants | Irganox 1076/Ciba Geigy |
| Compatibilizer | Citric Acid/ADM |
| Flame Retardant 1 | A boron phosphate available under the tradename Budit 326 from Budenheim |
| Flame Retardant 2 | A polysiloxane available under the tradename SF1706 from GE Silicones |
| SBS Impact Modifier | Vector 8508/Dexco |
| Polyamide 6 (Mw = 62,593) | CAPRON 1767 Honeywell |
| High Mw Polyamide 6 (Mw = 82,025) | CAPRON 1250 Honeywell |

TABLE 2

| | Comp. Ex 3 | Example 1 | Comp. Ex. 1 | Comp Ex. 2 |
|---|---|---|---|---|
| Polyphenylene ether | 34.73 | 32.23 | 34.73 | 32.23 |
| Antioxidants | 0.67 | 0.67 | 0.67 | 0.67 |
| Compatibilizer | 0.78 | 0.78 | 0.78 | 0.78 |
| Flame Retardant 1 | 3.4 | 3.4 | 3.4 | 3.4 |
| Flame Retardant 2 | 2.2 | 2.2 | 2.2 | 2.2 |
| SBS Impact Modifier | 0 | 5 | 0 | 5 |
| Polyamide 6 | — | — | 58.22 | 53.22 |
| High Mw Polyamide 6 | 58.22 | 53.22 | — | — |

TABLE 3

| | Units | Comp. Ex. 3 | Ex. 1 | Comp. Ex. 1 | Comp Ex. 2 |
|---|---|---|---|---|---|
| Notched Izod Impact | J/m | 44.8 | 64.1 | 34.2 | 49.1 |
| Reverse Notch Izod Impact | J/m | 1147 | 1741 | 536 | 697 |
| Average FOT per bar, 3.2 mm | Sec | 4.00 | 3.90 | 4.70 | 9.10 |
| % Pass UL94 V-0 test | % | 99.4 | 98.0 | 100.0 | 62.3 |

As can be seen from the foregoing examples, Comparative Example 1, which does not contain high molecular weight polyamide or impact modifier, shows excellent fire retardance (short flame out time and 100% probability of passing the UL94 flammability test) but notched Izod and reverse notched Izod impact values are low. Comparative Example 2 has a composition comparable to Comparative Example 1 but includes an impact modifier. The inclusion of the impact modifier improves the impact resistance (higher notched Izod and reverse notched Izod values) but flame resistance has decreased dramatically. Comparative Example 3 employs a high molecular weight polyamide but no impact modifier and when compared to Comparative Example 1 exhibits similar flame retardance and improved impact resistance. Example 1 employs a high molecular weight polyamide and an impact modifier. Given the comparison between Comparative Examples 1 and 2 one would expect that the flame retardance of Example 1 would be substantially lower than the flame retardance of Comparative Example 3 but surprisingly Example 1 exhibits comparable flame retardance to Comparative Examples 3 as well as improved impact resistance.

All patents cited herein are incorporated by reference.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. It is, therefore, intended that the invention not be limited to the particular embodiment disclosed as the best mode contemplated for carrying out this invention, but that the invention will include all embodiments falling with in the scope of the appended claims.

What is claimed is:

1. A composition comprising:

a poly(arylene ether) resin;

a polyamide resin having a weight average molecular weight greater than or equal to about 75,000 as determined by gel permeation chromatography using polystyrene standards;

an impact modifier; and a fire retardant.

2. The composition of claim 1, further comprising a compatibilizer.

3. The composition of claim 1, wherein the composition has a notched Izod impact of greater than or equal to about 45 Joules per meter.

4. The composition of claim 1, wherein the composition has a reverse notched Izod impact of greater than or equal to about 500 Joules per meter.

5. The composition of claim 1, wherein the composition has a flame retardance of V-1 or better at a thickness of about 3.2 millimeters.

6. The composition of claim 1, wherein the impact modifier is a block copolymer.

7. The composition of claim 6, wherein the block copolymer is a triblock copolymer.

8. The composition of claim 1, wherein the polyamide has a weight average molecular weight greater than or equal to about 79,000 as determined by gel permeation chromatography using polystyrene standards.

9. The composition of claim 8, wherein the polyamide has a weight average molecular weight greater than or equal to about 82,000 as determined by gel permeation chromatograhy using polystyrene standards.

10. The composition of claim 1, wherein the polyamide is an aliphatic polyamide.

11. The composition of claim 1, wherein the poly(arylene ether) has an intrinsic viscosity of about 0.10 to about 0.60 deciliters per gram as measured in chloroform at 25° C.

12. The composition of claim 1, when the composition comprises about 18 to about 65 weight percent poly(arylene ether), based on the total weight of the composition.

13. The composition of claim 1, wherein the composition comprises about 35 to about 70 weight percent polyamide, based on the total weight of the composition.

14. The composition of claim 1, wherein the composition comprises about 1 to about 15 weight percent impact modifier, based on the total weight of the composition.

15. The composition of claim 1, where the flame retardant comprises a polysiloxane of the formula

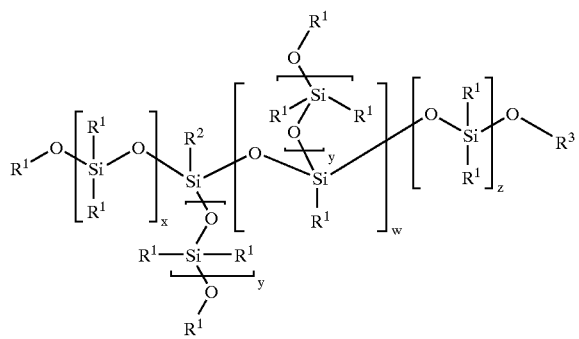
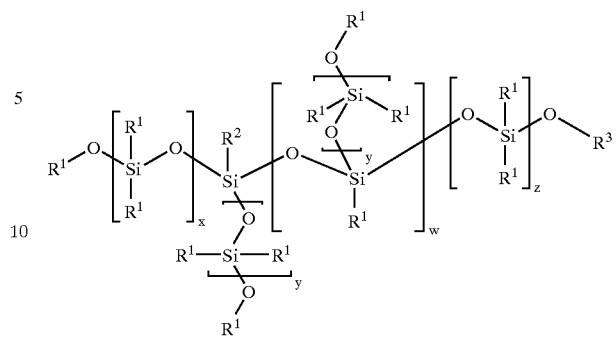

wherein each $R^1$ is independently a $C_{1-5}$ alkyl group, $R^2$ is a $C_{1-5}$ alkyl group or a primary or secondary amino group, provided that $R^2$ is a $C_{1-5}$ alkyl group when w is 1 and a N-(2-aminoalkyl)-3-aminoalkyl group when w is 0, $R^3$ is hydrogen or a $C_{1-5}$ alkyl group, w is 0 or 1 and x and y are each independently an integer from to 7 and z is an integer from 0 to 7 and at least one boron compound.

16. The composition of claim 15, wherein the boron compound is selected from the group consisting of metal borates, boric acid, organic boron compounds, perborates, boron phosphate and mixtures of two or more of the foregoing.

17. The composition of claim 15, further comprising an inorganic phosphate and/or titanium oxide.

18. The composition of claim 15, wherein the composition comprises about 1 to about 30 weight percent boron compound and about 1 to about 20 weight percent polysiloxane, based on the total weight of the composition.

19. A composition comprising the reaction product of a poly(arylene ether) resin;
   a polyamide resin having a weight average molecular weight greater than or equal to about 75,000 as determined by gel permeation chromatography using polystyrene standards;
   an impact modifier;
   a compatibilizer; and
   a fire retardant.

20. The composition of claim 19, wherein the composition has a notched Izod impact of grater than or equal to about 45 Joules per meter.

21. The composition of claim 19, wherein the composition has a reverse notched Izod impact of greater than or equal to about 500 Joules per meter.

22. The composition of claim 19, wherein the composition has a flame retardance of V-1 or better at a thickness of about 3.2 millimeters.

23. The composition of claim 19, wherein the impact modifier is a block copolymer.

24. The composition of claim 19, wherein the polyamide has a weight average molecular weight greater than or equal to about 79,000 as determined by gel permeation chromatography using polystyrene standards.

25. The composition of claim 24, wherein the polyamide has a weight average molecular weight greater than or equal to about 82,000 as determined by gel permeation chromatography using polystyrene standards.

26. The composition of claim 19, wherein the composition comprises about 18 to about 65 weight percent poly(arylene ether), about 35 to about 70 weight percent polyamide, and about 1 to about 15 weight percent impact modifier, based on the total weight of the composition.

27. The composition of claim 19, wherein the flame retardant comprises a polysiloxane of the formula wherein each $R^1$ is independently a $C_{1-5}$ alkyl group, $R^2$ is a $C_{1-5}$ alkyl group or a primary or secondary amino group, provided that $R^2$ is a $C_{1-5}$ alkyl group when w is 1 and a N-(2-aminoalkyl)-3-aminoalkyl group when w is 0, $R^3$ is hydrogen or a $C_{1-5}$ alkyl group, w is 0 or 1 and x and y are each independently an integer from 1 to 7 and z is an integer from 0 to 7 and at least one boron compound.

28. The composition of claim 27, wherein the boron compound is selected from the group consisting of metal borates, boric acid, organic boron compounds, perborates, boron phosphate and mixtures of two or more of the foregoing.

29. The composition of claim 27, further comprising titanium oxide.

30. The composition of claim 27, wherein the composition comprises about 1 to about 30 weight percent boron compound and about 1 to about 20 weight percent polysiloxane, based on the total weight of the composition.

31. The composition of claim 19, wherein the compatibilizer is citric acid.

32. A composition consisting essentially of:
   a poly(arylene ether) resin;
   a polyamide resin having a weight average molecular weight greater than or equal to about 75,000 as determined by gel permeation chromatography using polystyrene standards;
   an impact modifier,
   a polysiloxane of the formula

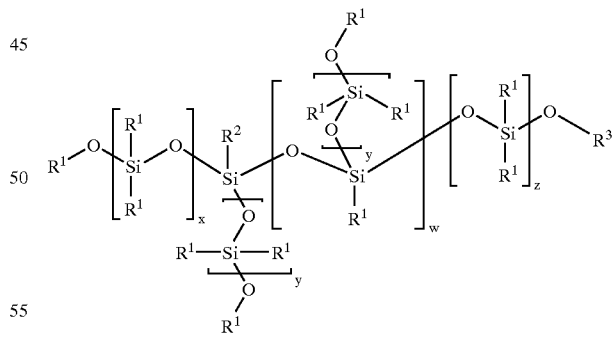

wherein each $R^1$ is independently a $C_{1-5}$ alkyl group, $R^2$ is a $C_{1-5}$ alkyl group or a primary or secondary amino group, provided that $R^2$ is a $C_{1-5}$ alky group when w is 1 and a N-(2-aminoalkyl)-3-aminoalkyl group when w is 0, $R^3$ is hydrogen or a $C_{1-5}$ alkyl group, w is 0 or 1 and x and y are each independently an integer from 1 to 7 and z is an integer from 0 to 7; and
   at least one boron compound.

* * * * *

UNITED STATES PATENT AND TRADEMARK OFFICE
CERTIFICATE OF CORRECTION

PATENT NO. : 6,875,824 B2
APPLICATION NO. : 10/604031
DATED : April 5, 2005
INVENTOR(S) : James Ross Fishburn Page 1 of 3

It is certified that error appears in the above-identified patent and that said Letters Patent is hereby corrected as shown below:

Title Page,
Item (73) Assignee, delete "Pittsfield, MA" and insert therefor --Schenectady, NY--.

Column 2,
Line 1, delete Formula (I) in its entirety and insert therefor

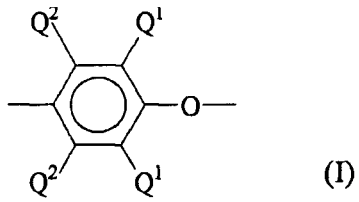

-- (I) --.

Column 2,
Line 22, after "hydrogen." start a new paragraph.

Column 2,
Line 46, delete "25Â°" and insert therefor --25°--.

Column 4,
Line 64, delete "cyanaurate" and insert therefor --cyanurate--.

Column 5,
Line 31, delete "R" and insert therefor --$R^3$--.

Column 5,
Line 37, after "polysiloxanes" insert --represented by the formulas III and IV--.

Column 5,
Line 38, delete Formula (III) in its entirety and insert therefor

Signed and Sealed this

Tenth Day of August, 2010

David J. Kappos
*Director of the United States Patent and Trademark Office*

CERTIFICATE OF CORRECTION (continued)

U.S. Pat. No. 6,875,824 B2

Page 2 of 3

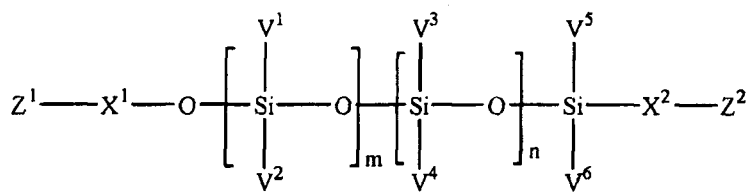

-- (III) --.

Column 5,
Line 48, delete Formula (IV) in its entirety and insert therefor

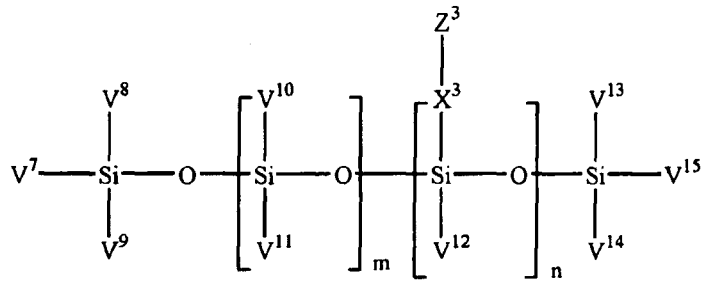

-- (IV) --.

Column 6,
Line 22, delete "pyrophospates" and insert therefor --pyrophosphates--.

Column 6,
Line 40, delete Formula (V) in its entirety and insert therefor

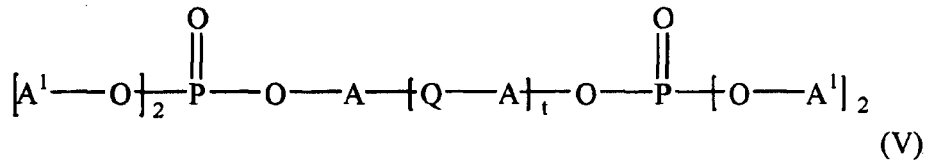

(V)

-- --.

Column 6,
Line 58, delete ",".

Column 6,
Line 59, delete ",".

Column 8,
Line 51, between "means" and "a" insert --of--.

Column 8,
Line 52, delete "Th" and insert therefor --The--.

CERTIFICATE OF CORRECTION (continued)
U.S. Pat. No. 6,875,824 B2

Column 8,
Line 57, delete "betwe" and insert therefor --between--.

Column 8,
Line 58, delete both instances of "Â".

Column 8,
Line 60, delete "wer" and insert therefor --were--.

Column 8,
Line 61, delete "Â".

Column 8,
Line 62, delete "Â".

Column 8,
Line 63, delete "notche" and insert therefor --notched--.

Column 9,
Line 2, delete "eac" and insert therefor --each--.

Column 9,
Line 4, delete "th" and insert therefor --the--.

Column 10,
Line 18, delete "with in" and insert therefor --within--.

Column 11,
Line 43, delete "grater" and insert therefor --greater--.

Column 12,
Line 60, delete "alky" and insert therefor --alkyl--.